Patented Sept. 16, 1952

2,610,973

UNITED STATES PATENT OFFICE 2,610,973

STABILIZATION OF GLYCERIDE OILS

Cyril D. Evans, Arthur W. Schwab, and John C. Cowan, Peoria, Ill., assignors to United States of America as represented by the Secretary of Agriculture No Drawing. Application June 9, 1950, Serial No. 167,244

4 Claims. (Cl. 260—398.5)

(Granted under the act of March 3, 1883, as amended April 30, 1928; 370 O. G. 757)

The invention herein described may be manufactured and used by or for the Government of the United States of America for governmental purposes throughout the world without the payment to us of any royalty thereon.

This invention relates to the treatment of glyceride oils and related materials such as synthetically produced esters of long chain fatty acids, and edible compositions comprising fats of animal or vegetable origin. It particularly relates to the treatment of such fatty substances to prevent oxidative deterioration and to increase the storage life and utility of such fatty substances as food materials.

Glyceride oils of animal or vegetable origin are known to deteriorate upon storage and to develop off-flavors and odors which reduce their utility and value as food materials or as ingredients in pharmaceutical or cosmetic compositions. This deterioration is mainly caused by oxidative processes which are extremely difficult to control. The difficulty of control is largely due to the presence of small quantities of metals in the oil which act as catalyst for the autooxidation of the oil.

This invention has among its objects the treatment of glyceride oils which contain small quantities of metallic constituents of the class which possesses oxidative catalytic properties, and to remove such metals or to neutralize their catalytic effect, thus increasing the oxidative stability of the oil. Still another object is to treat glyceride oils with phytic acid, thus improving the flavor stability of the oil under normal storage conditions.

We have discovered that phytic acid possesses the chemical property of combining with metals usually present in glyceride oils in such a way that the metals no longer can act as oxidation catalysts. The metals involved are those heavy metals such as, iron, copper, nickel and cobalt. The action of phytic acid is therefore of the nature of a scavenger for these metals.

We have discovered that phytic acid improves greatly the oxidative stability and the flavor stability of glyceride oils, particularly vegetable oils, such as soybean oil, cottonseed oil, peanut oil, mustard seed oil, corn oil and the like. Its effect is pronounced upon the oil in the raw state, as refined by conventional procedure, or in the presence of added metals. We have discovered furthermore that phytic acid has the surprising property of preventing oxidative deterioration in glyceride oils which are potentially very unstable.

Glyceride oils vary in natural stability, and also vary considerably in their content of heavy metal impurities. In the case of commercially refined edible oils of different origins the iron content may vary as much as one hundredfold, ranging from 0.03 up to almost 5.0 parts per million. The copper content varies as much as tenfold. These and other factors result in a wide variance in the potential stability of the oils themselves. Many substances are known which will control the oxidative deterioration of the relatively stable oils, i. e. those having relatively low A. O. M. values. However, those having high A. O. M. values, i. e., the potentially unstable oils, for example, those high in heavy metal content, deteriorate rapidly even in the presence of the usual oxidation retarders. In contrast, phytic acid will "hold up" these oils to a degree comparable with the stable or "good" oils. In consonance with the above characteristics, physic acid exhibits very high stabilizing effects on oils to which relatively large quantities of catalytically active metals have been added.

Phytic acid, the hexaphosphate of mesoinositol, may be procured from plant sources and is relatively inexpensive. One common source is from the wet milling of corn. According to our invention it is added to the oil which is desired to be stabilized in an amount ranging from 0.001 to 0.1 percent based on the weight of the oil. The addition is relatively simple, since the phytic acid is easily dispersible in the oils in this range. The addition may be effected at any desired stage in the conventional treatment of oils.

The following experimental data illustrates the invention.

Samples of soybean oil and cottonseed oil were treated with phytic acid in the amounts shown in the table. Additional control samples containing no phytic acid were also subjected to the tests. As a further basis of comparison one sample of oil containing 0.01 percent citric acid was prepared and tested. Oil samples containing added catalytically active metals were also evaluated, both with and without phytic acid.

A chemical evaluation, known as the modified Swift Stability test was made, which provides the peroxide or A. O. M. values, after the samples are blown with air for 8 hours at 208° F. The oils tested were also evaluated organoleptically. The testing panel was composed of persons skilled in taste testing, and the flavor scores given are based on a maximum possible score of 10. The test samples containing the phytic acid were found markedly superior in both the chemical and organoleptic evaluations, compared with the untreated control samples as may be seen from the table. Moreover, oil No. 5, a potentially unstable oil, when treated with phytic acid was rendered quite stable. This effect was considerably superior to the effect of citric acid, a conventional and widely used additive for preventing oxidative and flavor deterioration in glyceride oils.

4. Process of stabilizing soybean oil against oxidative deterioration which comprises incorporating from 0.001 to 0.1 percent by weight phytic acid.

CYRIL D. EVANS.
ARTHUR W. SCHWAB.
JOHN C. COWAN.

Table

| Oil | CONTROL | | | 0.01% Phytic acid | | | 0.1% Phytic acid | 0.01% Citric acid |
|---|---|---|---|---|---|---|---|---|
| | A. O. M.[1] | Flavor score | | A. O. M. | Flavor score | | A. O. M. | A. O. M. |
| | | At 0 time | Stored 8 da. at 60° C. | | At 0 time | Stored 8 da. at 60° C. | | |
| Oil No. 1, cottonseed | 40.0 | 8.5 | 4.0 | 14.2 | 8.8 | 5.9 | | |
| Oil No. 1 + 0.3 p. p. m. Fe | 49.0 | 8.4 | 3.8 | 17.7 | 8.4 | 5.3 | | |
| Oil No. 2, cottonseed | 38.2 | | | 16.8 | | | 13.9 | |
| Oil No. 3, soybean | 69.6 | | | 17.6 | | | | 47.4 |
| Oil No. 4, soybean | 63.4 | | | 12.8 | | | 6.8 | |
| Oil No. 5, soybean | 11.0 | 9.0 | 7.4 | 2.2 | 8.8 | 6.1 | | |
| Oil No. 5 + p. p. m. Fe | 55.0 | | | 2.2 | 8.8 | 5.8 | | |
| Oil No. 6, soybean | 41.0 | | | | | | | |
| Oil No. 6 + 0.01 p. p. m. Cu | | | | 3.3 | | | | |
| Oil No. 6 + 0.1 p. p. m. Cu | 100 | | | 3.4 | | | 5.5 | |

[1] Peroxide values determined by active oxygen method (8 hr.–100° C.)

We claim:
1. A new composition of matter, a glyceride oil and a stabilizing amount of phytic acid.
2. A new composition of matter as described in claim 1 in which the glyceride oil is of vegetable origin and the phytic acid is present within the range of 0.001 and 0.1 percent based on the weight of the oil.
3. A stabilized soybean oil containing from 0.001 to 0.1 percent phytic acid.

REFERENCES CITED

The following references are of record in the file of this patent:

UNITED STATES PATENTS

| Number | Name | Date |
|---|---|---|
| 1,938,999 | Cox | Dec. 12, 1933 |
| 2,128,926 | Epstein | Sept. 6, 1938 |
| 2,239,543 | Andrews et al. | Apr. 22, 1941 |
| 2,443,835 | Pederson | June 22, 1948 |